J. BLACKIE.
Telegraphic Switch.
No. 56,886.
Patented Aug. 7, 1866.
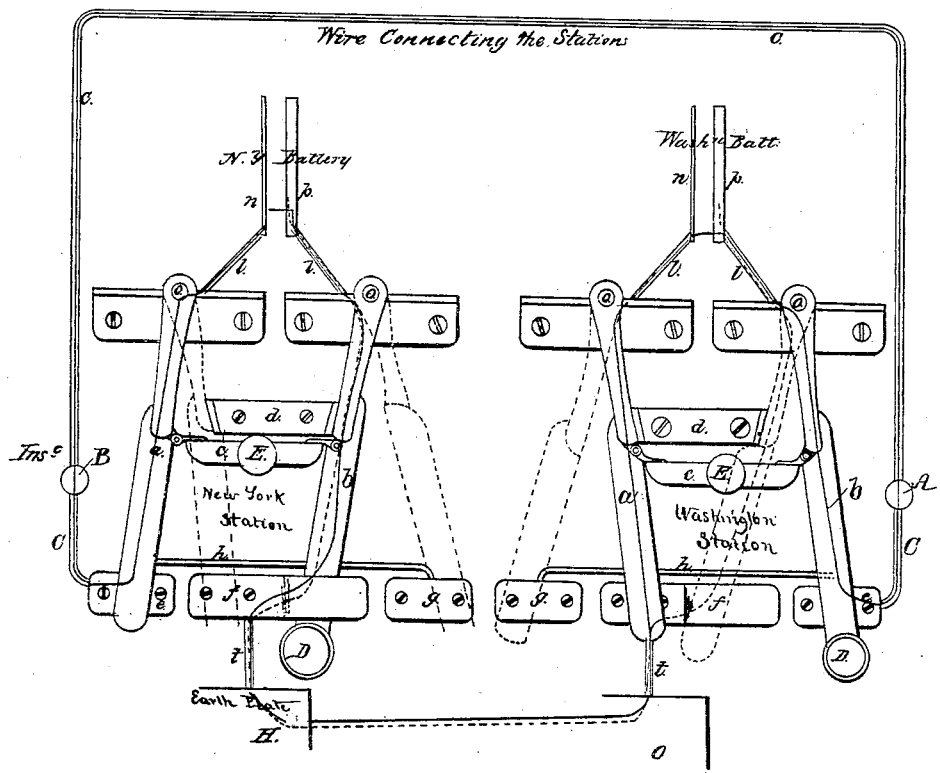
Witnesses,
Charles Mac Rae.
P. T. Dodge.
Inventor:
John Blackie
By his attorney
W. L. Dodge.

UNITED STATES PATENT OFFICE.

JOHN BLACKIE, OF NEW YORK, N. Y.

IMPROVEMENT IN ELECTRIC TELEGRAPHS.

Specification forming part of Letters Patent No. 56,886, dated August 7, 1866.

*To all whom it may concern:*

Be it known that I, JOHN BLACKIE, of New York, in the county of New York and State of New York, have invented certain new and useful Improvements in Telegraphic Apparatus; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in the construction and application to telegraph-lines or other electric circuits of a switch by which two batteries, or two cells of the same battery, may be made to neutralize each other, and thus render them inoperative for the time being, and still permit a message or impulse to be sent from either end of the line whenever desired.

In the drawings, I have represented my switch applied at each end of a telegraph-line, the stations at the respective ends, for illustration, being denominated "Washington" and "New York."

It is well understood by those familiar with the science that the resistance encountered by a current of electricity when transmitted through a wire or other conductor increases in proportion to the distance it travels. It is also well understood that by using a battery at each end of a line less battery-power is required to operate the line than where a battery is used at one end only. It is further known, also, that the maintaining of the batteries in proper working order is a constant source of expense, care, and trouble, and that, therefore, the economizing of the battery-power is a very desirable object. To accomplish this is the object of my invention.

It is well understood that in all batteries, whether composed of one or more cells, there is a negative and a positive pole, and that when it is desired to create a current of electricity between them the negative pole of one cell or battery must be connected to the positive pole of the other, while the negative pole of the latter must in like manner be connected to the positive pole of the former. It is in this manner that the two batteries at opposite ends of a telegraph-line are connected, and it is obvious that so long as they are kept thus connected the current of electricity will continue to pass from one to the other until the batteries become exhausted.

In ordinary telegraph-lines the batteries are kept constantly united and a current continually passing, in order that messages may be at any moment sent in either direction, and thus the power of the battery is being constantly used up, even when no message is being sent.

By means of my improved switch I am enabled to so change the connection of the batteries as to connect the negative pole of one battery with the negative pole of the other, and the positive pole of one with the positive pole of the other, thereby rendering the battery inoperative and still permit a message to be sent whenever desired.

My switch consists of two hinged bars or rods, $a$ and $b$, each being pivoted at $o$, so as to permit them to be moved laterally, as shown in red. These bars $a$ and $b$ are connected by a cross-bar, $c$, pivoted at each end, and provided with a knob, E, by which they may be moved, the connecting-piece $c$ being composed of any suitable non-conducting material. A stop, $d$, is secured in proper position to limit the lateral movement of the bars $a$ and $b$ as required.

Near the front end of the bars $a$ and $b$ are located three metallic plates or knobs, $e$, $f$, and $g$, as shown in the drawings. The plates $e$ and $g$ are connected by a wire, $h$, as shown, the plate $e$ being also connected to the main line C, the other plate, $f$, being connected with the earth-plate by means of the wire $t$, as clearly shown, the plate $f$ having one end so raised as to permit the bar $b$ to pass under and rest against its under side, as shown in the left-hand figure, the bar $a$ at the same time resting upon the plate $e$. The bar $b$ is a spring, and is provided with a knob, D, by which, when moved to the right, as shown in red in the left-hand figure, it can be pressed down in contact with plate $g$, for the purpose of operating it, as in the ordinary instrument. It will be observed that when arm *b* is thus moved over to plate *g* the arm *a* will also be moved over to and will rest upon plate *f*.

The positive pole of the battery is represented by *p*, and the negative pole by *n*, the former being connected to arm *b* of the switch, and the latter to arm *a* by the wires *l*, as shown in the drawings.

In the drawings the switch at the Washington station is represented as moved to the right, in which case the spring-arm *b* is brought directly over the plate *e*, this spring-arm serving as a contact-maker, it being operated by pressing on the knob D, and thus forcing it down in contact with the plate *e*, thereby closing the circuit in the usual manner. When thus arranged the line is in condition for sending a message from the Washington station, the current making the circuit by the route indicated by the blue line, which will be as follows: Starting from the positive pole of the Washington battery, it will pass along the wire *l* to arm *b*, thence to plate *e*; from there, along the main wire C, operating the instrument B at the New York station, thence to plate *e*, along arm *a* and wire *l*, to the negative pole of the New York battery, through said battery, along wire *l* to arm *b*, thence to plate *f*, along wire *t* to plate H, thence, by the earth, to plate O, and along wire *t*, plate *f*, arm *a*, and wire *l* to the negative pole of the battery, from which it started, thus completing the circuit.

After the message has been sent the switch will be moved to the left, as shown in red, by which operation the connection of the batteries will be so changed as to connect the negative pole of one with the negative pole of the other, their positive poles being similarly connected, as will be seen by tracing the connection, as shown by the red line. It matters not from which pole of either battery the connection is traced, it will be found that in all cases, when both switches are thrown off, the connection uniformly leads from one pole of either battery to the same pole of the opposite battery, and, of course, when so arranged the batteries will cease to act or expend their power, thereby greatly economizing in the use and expense of keeping up the batteries.

Whenever it is desired to send a message from either end of the line—that is, from either station—it is only necessary for the operator at that end to throw the switch to the right, and the connection of the batteries is thereby changed back to its original condition, when the message can be sent, as before.

It will thus be seen that by simply moving the switch at either end of the line the batteries can be thrown in or out of operation instantly, and that the same can be done by the operator at either end of the line at will. It will of course be understood that the switch and connections at one end of the line are a duplicate of those at the opposite end.

By these means the batteries can be rendered inoperative at all times, except at the instant the message is being sent, whereby a great saving in the expenditure of battery power and expense is effected.

Having thus described my invention, what I claim is—

The construction and application of a switch to a line connecting two batteries in such a manner that the electric current between the batteries may be reversed or transferred from one to the other of the poles of said batteries at will, whereby the batteries shall be made to neutralize each other, and thus remain dormant for the time being, substantially as set forth.

JOHN BLACKIE.

Witnesses:
  W. C. DODGE,
  JAMES L. BRANSON.